Nov. 19, 1968  J. M. GOTSCH, JR  3,411,457
FREE TROLLEYS FOR POWER AND FREE CONVEYORS
Filed June 9, 1966  3 Sheets-Sheet 1

INVENTOR.
JOHN MARTIN GOTSCH, JR.
BY
Barnes, Kisselle, Raisch & Choate
ATTORNEYS Nov. 19, 1968  J. M. GOTSCH, JR  3,411,457
FREE TROLLEYS FOR POWER AND FREE CONVEYORS
Filed June 9, 1966  3 Sheets-Sheet 2

INVENTOR.
JOHN MARTIN GOTSCH, JR
BY
Barnes, Kisselle, Raisch & Choate
ATTORNEYS

INVENTOR.
JOHN MARTIN GOTSCH, JR.

3,411,457
FREE TROLLEYS FOR POWER AND FREE CONVEYORS
John M. Gotsch, Jr., Westfield, N.J., assignor to Mechanical Handling Systems, Inc., Warren, Mich., a corporation of Michigan
Filed June 9, 1966, Ser. No. 556,364
10 Claims. (Cl. 104—172)

ABSTRACT OF THE DISCLOSURE

The power and free conveyor system disclosed herein comprises a leading trolley and a trailing trolley interconnected by a tie bar. The leading trolley has a body, a pusher dog pivoted to the body and a hold back dog pivoted to the body. A pair of wheel mounting brackets are pivoted about vertical axes on the body of the leading trolley and wheels and guide rollers are rotatably mounted thereon. The trailing trolley comprises a body and wheels and guide rollers rotatably mounted thereon.

---

This invention relates to power and free conveyors and particularly to free trolley assemblies for such conveyors.

Among the objects of the invention are to provide a free trolley for power and free conveyors which are low in cost, simple in construction and will effectively provide for accumulation of successive trolleys in all level portions of the track.

Figure 1:
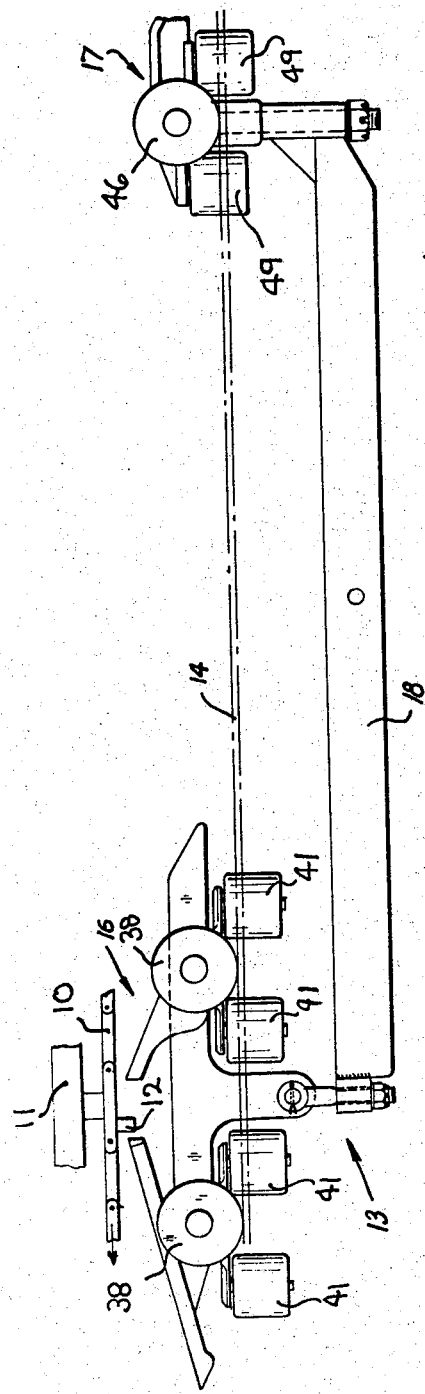
FIG. 1 is a partly diagrammatic side elevational view of a power and free conveyor embodying the invention.
Figure 4:
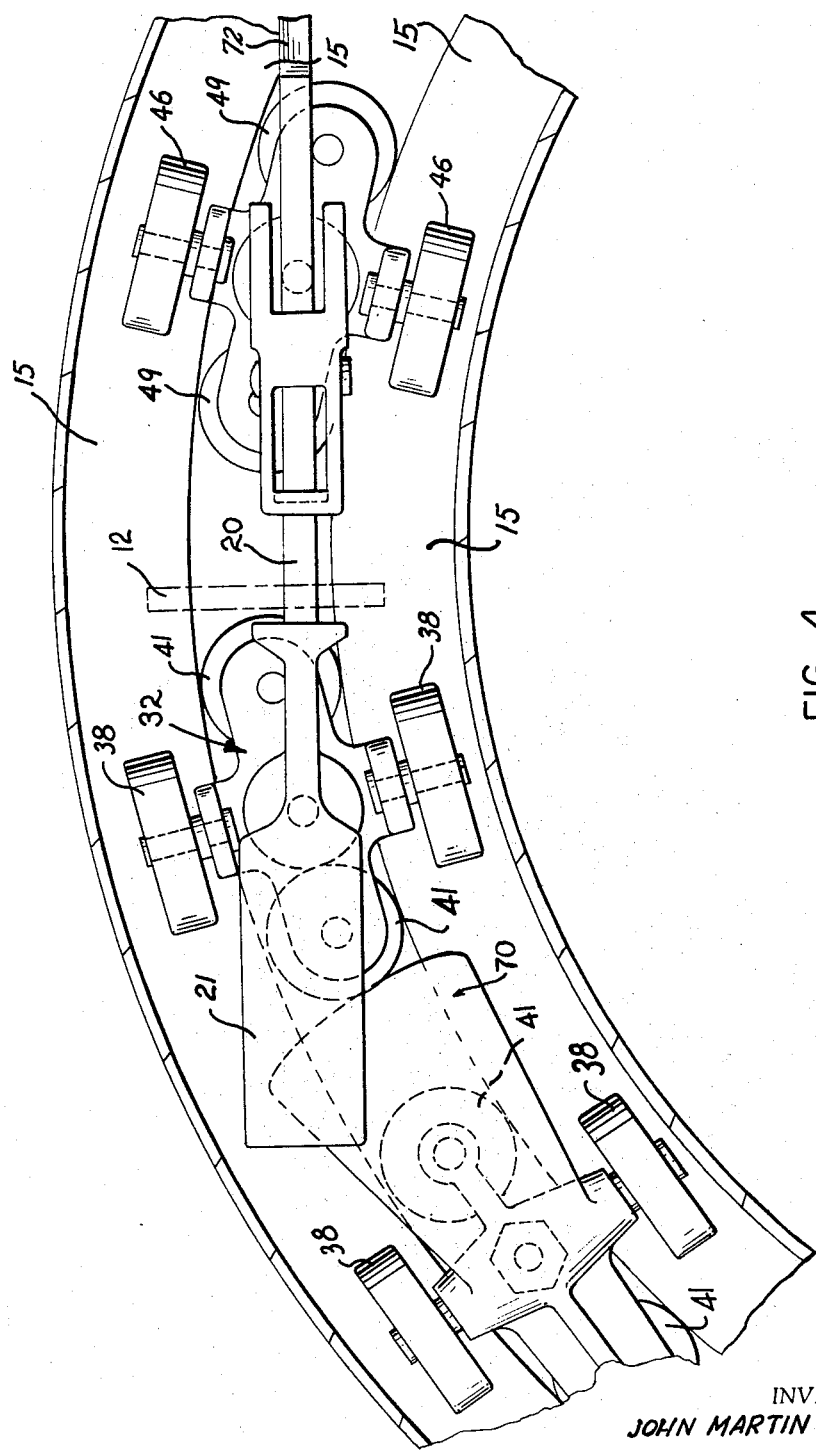
FIG. 4 is a fragmentary plan view of a portion of the trolley embodying the invention, showing its movements through a curved section of track.

Referring to FIG. 1, the invention relates to a power and free conveyor wherein a conveyor chain 10 is supported in an upper track 11 and includes a plurality of downwardly extending pusher members 12 that are adapted to engage and move trolley assembly 13 along a lower track 14. The track 14 comprises opposed channel or angle members 15 (FIG. 4).

As shown in FIG. 1, each trolley assembly 13 comprises a leading trolley 16, a trailing trolley 17 and an interconnecting tie bar 18.

Figure 2:
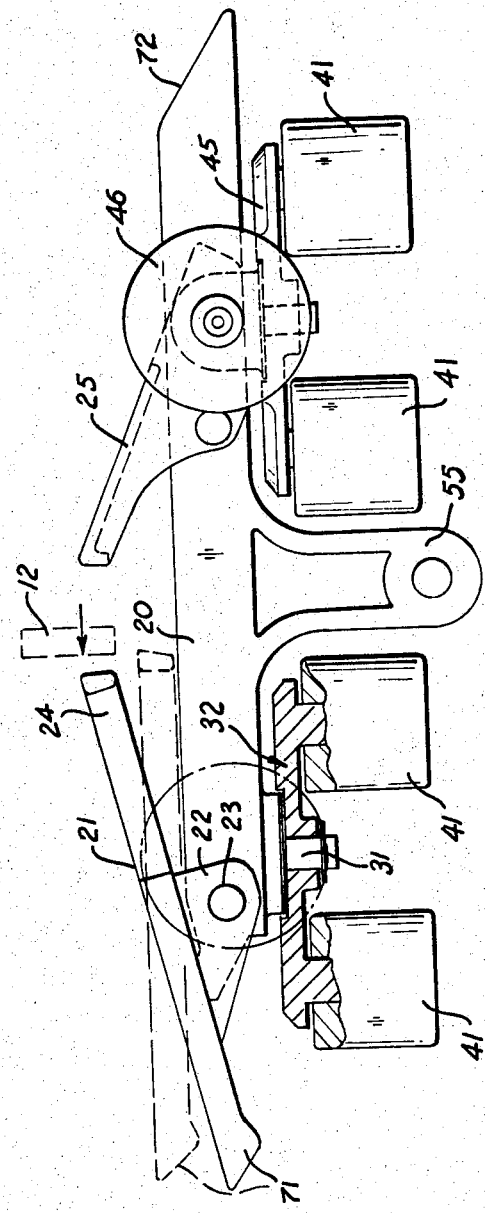
FIG. 2 is a fragmentary side elevational view of the trolley shown in FIG. 1.
Figure 3:
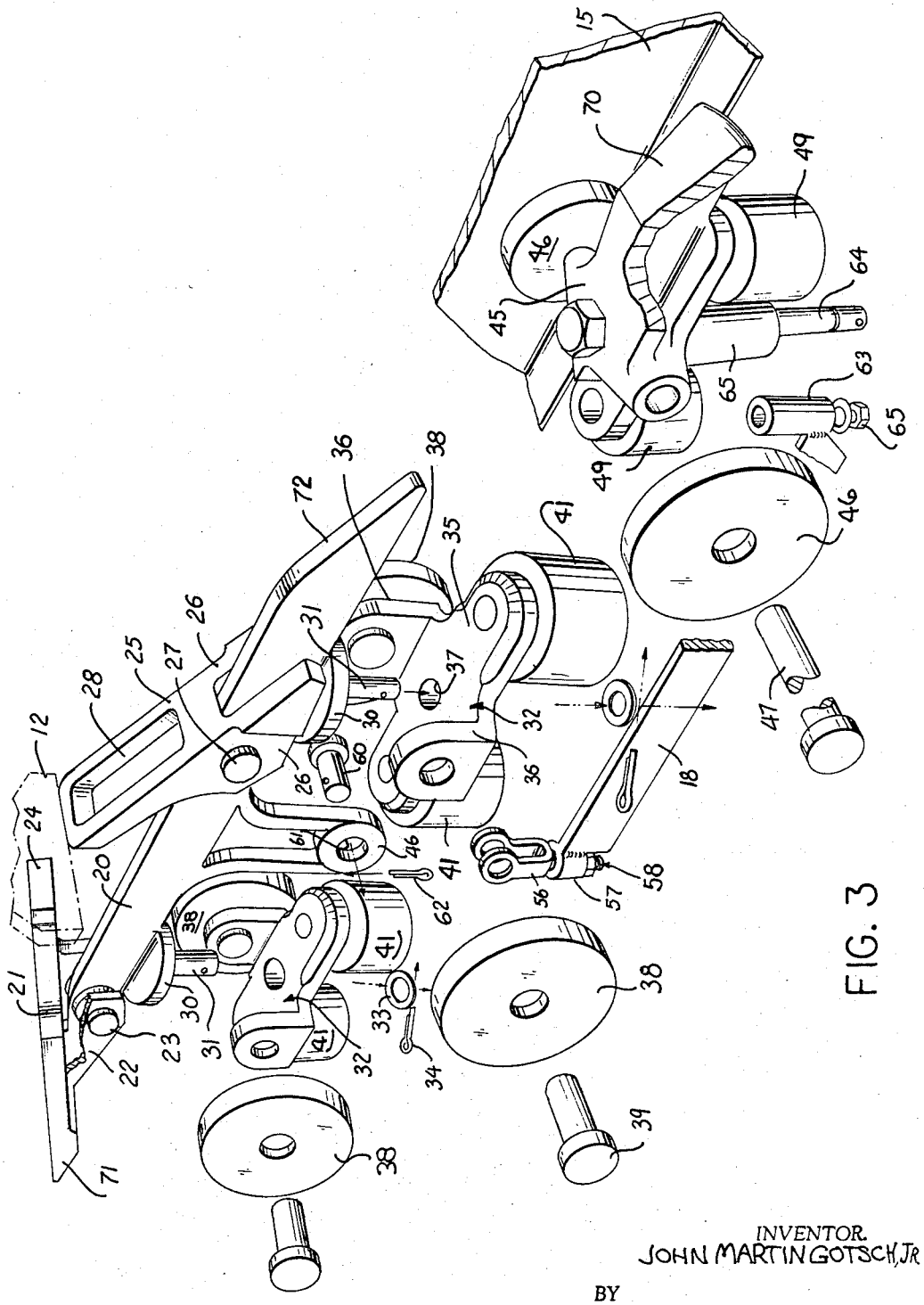
FIG. 3 is a fragmentary part sectional exploded perspective view of the trolley embodying the invention.

The leading trolley 16 comprises a body 20 which is made of a single elongated bar and has a pusher dog 21 pivoted to the leading end thereof. As shown in FIGS. 2 and 3, the pusher dog 21 comprises an elongated bar that has an integral bracket 22 on the underside thereof whereby it is pivoted to the leading end of the body 20 by a pivot pin 23. The pivot point of the pusher dog 21 is selected such that the weight of the leading end biases the trailing end 24 upwardly into the path of the pusher member 12. As is presently described, when the pusher bar 21 is rotated to the broken line position shown in FIG. 2, the pusher bar 12 will clear the trailing end 24 of the pusher bar 21.

A hold back dog 25 is pivoted adjacent the rear end of the body 20 of the leading trolley 16 and comprises a generally elongated member that has downwardly extending flanges 26 which straddle the bar 20. A pivot pin 27 extends through the flanges and bar 20 to pivot the hold back dog 25 to the bar 20. The upper end of the hold back dog 25 is cut away as at 28 so that the upper end of the hold back dog is biased upwardly into position for holding the trolley back from rolling back by engagement with a pusher member 12.

The body 20 is formed with bearing pads 30 at longitudinally spaced points on the underside thereof and pins 31 extend downwardly from the pads 30. A wheel mounting bracket 32 is rotatably mounted on each pin 31 and held thereon by a washer 33 and cotter pin 34. Each bracket 32 comprises a flat portion 35 and upwardly extending flanges 36 which extend upwardly from the sides of the flat portion 35. Each pin 31 extends downwardly through an opening 37 in its respective bracket 32. Wheels 38 are rotatably mounted on each flange 36 by an axle rivet 39. The wheels are adapted to engage the upper sides of the flanges of track 15. Guide rollers 41 are rotatably mounted about vertical axes on the flat portion 35 of each bracket 32 and are adapted to engage the edges of the flanges of the track 15.

The trailing trolley 17 comprises a cast body 45 which has wheels 46 rotatably mounted about horizontal axes thereon by means of an axle rivet 47. Guide rollers 49 are rotatably mounted about longitudinally spaced vertical axes on the body 45 for engagement with the edges of the flanges of channels 15.

The tie bar 18 is connected to a downwardly extending projection 55 on the leading trolley 16 by a yoke 56 that is swiveled to a collar 57 fixed on the leading end of the tie bar 18. A pin 58 on yoke 56 extends through collar 57 and a nut is threaded on pin 58. A cross pin 60 extends through openings in the yoke 56 and an opening 61 in the downwardly extending projection 55 and a cotter pin 62 extends through the pin to complete the connection.

The trailing end of the tie bar 18 has an integrally formed sleeve 63 which telescopes over a bolt 64 that extends downwardly from a projection 65 in the body 45. A slotted nut 65 holds the sleeve and, in turn, the tie bar on the bolt 64.

As shown in FIGS. 2 and 3, the trailing portion of the body 45 is formed with an upwardly and forwardly inclined surface 70 which is adapted to be engaged by an upwardly and forwardly inclined surface 71 on the pusher bar 21 of a trailing trolley. When a leading trolley is interrupted in its movement, the surface 71 of the succeeding carrier engages the surface 70 and causes the pusher bar 21 to be moved to the broken line position shown in FIG. 2, permitting the pusher member 12 on the chain 10 to move forwardly and thereby interrupting the movement of the trolley. As shown in FIG. 4, the lateral extent of the surface 70 is substantially greater in width than the width of pusher bar 21 so that accumulation can occur even on horizontally curved portions of the track 14 as shown in FIG. 3.

Although the trolley structure has been shown in connection with a leading trolley and a trailing trolley where large loads are to be carried, it should be understood that the leading trolley can be utilized independently and a load can be supported directly from the downwardly extending projection 55. In such event, the trailing portion of the bar 20 is formed with an inclined surface 71' so that successive trolleys 16 can accumulate.

Since the parts are of rather simple inexpensive construction, the cost of the carriers is substantially reduced.

I claim:

1. In a power and free conveyor wherein a continuously driven conveyor having pusher members thereon is adapted to push carriers in a predetermined path, the combination wherein each said trolley assembly comprises
    a leading trolley,
    a trailing trolley,
    said leading trolley comprising a body, a pusher dog pivoted adjacent the leading end of said body and biased for engagement with a pusher member on a chain conveyor, a hold back dog pivoted adjacent the trailing end of said body and biased for hold back relation to a pusher member on a conveyor, a first wheel mounting bracket pivoted about a vertical axis adjacent the front end of said trolley body, a second wheel mounting bracket pivoted about a vertical axis adjacent the rear end of said trolley body, a pair of wheels rotatably mounted on each said bracket about a horizontal axis, a pair of guide rollers rotatably mounted on each said bracket about longitudinally spaced vertical axes, said trailing trolley comprising a body, a pair of wheels rotatably mounted on said body about a horizontal axis, a pair of guide rollers rotatably mounted on said body about longitudinally spaced vertical axes, a tie bar, means pivoting the leading end of said tie bar to said body of said leading trolley for movement about a vertical axis, and means for pivoting the trailing end of said tie bar to said body of said trailing trolley for movement about a vertical axis.

2. The combination set forth in claim 1 wherein the trailing trolley has an upwardly and forwardly inclined surface thereon, said pusher dog of the leading trolley having a contacting surface adapted to engage the surface of a trailing preceding trolley on a trolley assembly to cause said pusher dog to be moved downwardly out of the path of a pusher member when the pusher dog engages said surface of said preceding trolley.

3. The combination set forth in claim 2 wherein said surface on said trailing trolley has a substantially greater lateral width to permit accumulation of the carriers on a horizontally curved section of track.

4. In a power and free conveyor system wherein a conveyor chain having pusher members is adapted to engage and move carriers along a track, the combination comprising a leading trolley, a trailing trolley, said leading trolley having a body consisting of an elongated longitudinally extending bar, a pusher dog pivoted to the leading end of said bar, said pusher dog being counterweighted so that the upper end thereof is normally biased into position for engagement with a pusher member of a conveyor, a hold back dog pivoted to the trailing end of said body and counterweighted so that an end thereof is normally biased upwardly into the path of a pusher member to serve as a hold back, a pair of pins extending downwardly at longitudinally spaced points on said body, bearing pads adjacent the upper ends of said pins, a pair of wheel mounting brackets, each bracket comprising a substantially flat body portion, each said pin extending through an opening in its respective wheel mounting bracket, a pair of guide rollers rotatably mounted on the flat portion of each said bracket at longitudinally spaced points thereon, a flange extending upwardly from the flat body portion of each said bracket along each side thereof, a wheel rotatably mounted about a horizontal axis on each said flange, said body having a downwardly extending portion intermediate its ends, said trailing trolley comprising a body, a pair of wheels rotatably mounted for rotation about horizontal axes on said body, a pair of rollers mounted for rotation about vertical axes at longitudinally spaced points on said body, a tie bar, means for pivotally mounting the leading end of said tie bar on the projection of the body of the leading trolley for movement about a vertical axis, means for pivoting the trailing end of said tie bar to the body of said trailing trolley for rotation about a vertical axis.

5. The combination set forth in claim 4 wherein the trailing trolley has an upwardly and forwardly inclined surface thereon, said pusher dog of the leading trolley having a contacting surface adapted to engage said upwardly and forwardly inclined surface of said preceding trailing trolley to cause said pusher dog to be moved downwardly out of the path of a pusher member when the pusher dog engages the surface of said preceding trolley.

6. The combination set forth in claim 5 wherein said surface on said trailing trolley has a substantially greater lateral width to permit accumulation of the trolleys on a curved section of track.

7. In a power and free conveyor wherein a continuously driven conveyor having pusher members thereon is adapted to push trolleys in a predetermined path, the combination wherein each said carrier comprises a trolley, said trolley comprising a body, a pusher dog pivoted adjacent the leading end of said body and biased for engagement with a pusher member on a chain conveyor, a hold back dog pivoted adjacent the trailing end of said body and biased for hold back relation to a pusher member on a conveyor, a first wheel mounting bracket pivoted about a vertical axis adjacent the front end of said trolley, a second wheel mounting bracket pivoted about a vertical axis adjacent the rear end of said trolley body, a pair of wheels rotatably mounted on each said bracket about a horizontal axis, and a pair of guide rollers rotatably mounted on each said bracket about longitudinally spaced vertical axes.

8. The combination set forth in claim 7 wherein the trolley has an upwardly and forwardly inclined surface thereon, said pusher dog of the trolley having a contacting surface adapted to engage the upwardly and forwardly inclined surface of a preceding trolley to cause said pusher dog to be moved downwardly out of the path of a pusher member when the pusher dog engages the surface of a preceding trolley.

9. In a power and free conveyor system wherein a conveyor chain having pusher members is adapted to engage and move carriers along a track, the combination comprising a trolley, said trolley having a body consisting of an elongated longitudinally extending bar, a pusher dog pivoted to the leading end of said bar, said pusher dog being counterweighted so that the upper end thereof is normally biased into position for engagement with a pusher member of a conveyor, a hold back dog pivoted to the trailing end of said body and counterweighted so that an end thereof is normally biased upwardly into the path of a pusher member to serve as a hold back, a pair of pins extending downwardly at longitudinally spaced points on said body, bearing pads adjacent the upper ends of said pins, a pair of wheel mounting brackets, each bracket comprising a substantially flat body portion, each said pin extending through an opening in its respective said wheel mounting bracket, a pair of guide rollers rotatably mounted on the flat portion of each said bracket at longitudinally spaced points thereon, a flange extending upwardly from the flat body portion of each said bracket along each side thereof, a wheel rotatably mounted about a horizontal axis on each said flange, said body having a downwardly extending portion intermediate its ends.

10. The combination set forth in claim 9 wherein the trolley has an upwardly and forwardly inclined surface thereon, said pusher dog of the trolley having a contacting surface adapted to engage the upwardly and forwardly inclined surface of a preceding trolley to cause said pusher dog to be moved downwardly out of the path of a pusher member when the pusher dog engages the surface of said preceding trolley.

References Cited

UNITED STATES PATENTS

| 3,229,645 | 1/1966 | Dehne | 104—96 |
| 3,314,378 | 4/1967 | Potter | 104—96 |

ARTHUR L. LA POINT, *Primary Examiner.*

D. F. WORTH, *Assistant Examiner.*